United States Patent [19]

Oushiden et al.

[11] Patent Number: 4,816,871

[45] Date of Patent: Mar. 28, 1989

[54] CHARGING CONTROL APPARATUS FOR IMAGE CARRIER

[75] Inventors: Hideshi Oushiden, Kawasaki; Hiroshi Matsumoto, Yokohama, both of Japan

[73] Assignee: Kabushiki Kaisha Toshiba, Kawasaki, Japan

[21] Appl. No.: 127,392

[22] Filed: Dec. 2, 1987

[30] Foreign Application Priority Data

Dec. 5, 1986 [JP] Japan ................................ 61-290044

[51] Int. Cl.[4] ....................... G03G 15/00; G03B 27/52

[52] U.S. Cl. ................................ 355/3 CH; 355/3 D; 361/229

[58] Field of Search .............. 355/3 CH, 14 CH, 3 D; 361/229, 23 D, 235; 250/324–326

[56] References Cited

U.S. PATENT DOCUMENTS 3,805,069 4/1974 Fisher ............................ 361/229 X

*Primary Examiner*—L. T. Hix

*Assistant Examiner*—D. Rutledge

*Attorney, Agent, or Firm*—Foley & Lardner, Schwartz, Jeffery, Schwaab, Mack, Blumenthal & Evans

[57] ABSTRACT

An image carrier carries an electrostatic latent image. A charger charges the image carrier to carry the electrostatic latent image. A high-voltage source supplies a high-voltage output to the charger for charging. A temperature detector detects the temperature of the image carrier. A charging controller outputs a control signal for regulating the high-voltage output of the high-voltage source in response to the temperature detection signal from the temperature detector. The control signal has the ability to compensate for changes in the charging of the image carrier by controlling the high-voltage output of the high-voltage source, in accordance with changes in temperature of the image carrier.

10 Claims, 4 Drawing Sheets

CHARGING CONTROL APPARATUS FOR IMAGE CARRIER

BACKGROUND OF THE INVENTION

This invention relates to a charging control apparatus for an image carrier and, more particularly, to an image forming apparatus, such as an electronic copying machine.

Generally, sensitivity (charging), of a photosensitive drum, serving as an image carrier for forming an electrostatic latent image in an electronic copying machine, is greatly influenced by change in ambient temperature or a temperature rise, in the copying machine caused by continuous copying operations. If copying operations are performed in the state wherein the sensitivity is changed, the quality of a copied image is thus degraded.

More specifically, charge retentivity (charging), of a photosensitive drum of amorphous selenium, amorphous silicon, or the like, is generally attenuated as the temperature of the drum rises. Therefore, a density distribution of the charge occurs, i.e., copying quality becomes nonuniform, resulting in poor quality of the copied image. Furthermore, if the drum exceeds a given temperature (or is below a given temperature), the photsensitive drum often malfunctions as an image carrier.

However, measures to alleviate such problems, caused by changes in temperature of the photosensitive drum, have never been taken.

SUMMARY OF THE INVENTION

It is, therefore, an object of the present invention to provide a new and improved charging control apparatus for an image carrier, which can prevent a change in charging (sensitivity) of the image carrier from changes in temperature.

According to the present invention, there is provided a charging control apparatus for an image carrier, the apparatus comprising:

- an image carrier for carrying an electrostatic latent image;
- a charger for charging the image carrier to carry the electrostatic latent image;
- a high-voltage source for supplying a high-voltage output to the charger for charging;
- a temperature detection means for detecting the temperature of the image carrier; and
- a charging control means for outputting a control signal, controlling the voltage output of the high-voltage source in response to a temperature detection signal from the temperature detection means, the control signal having the ability to compensate for changes in the charging of the image carrier by controlling the voltage output of the high-voltage source, in accordance with changes in temperature of the image carrier.

BRIEF DESCRIPTION OF THE DRAWINGS

These and other objects and features of the present invention can be understood in reference to the accompanying drawings, in which.

DETAILED DESCRIPTION OF THE PREFERRED EMBODIMENT

An embodiment of the present invention will now be described with reference to the accompanying drawings.

Figure 5:
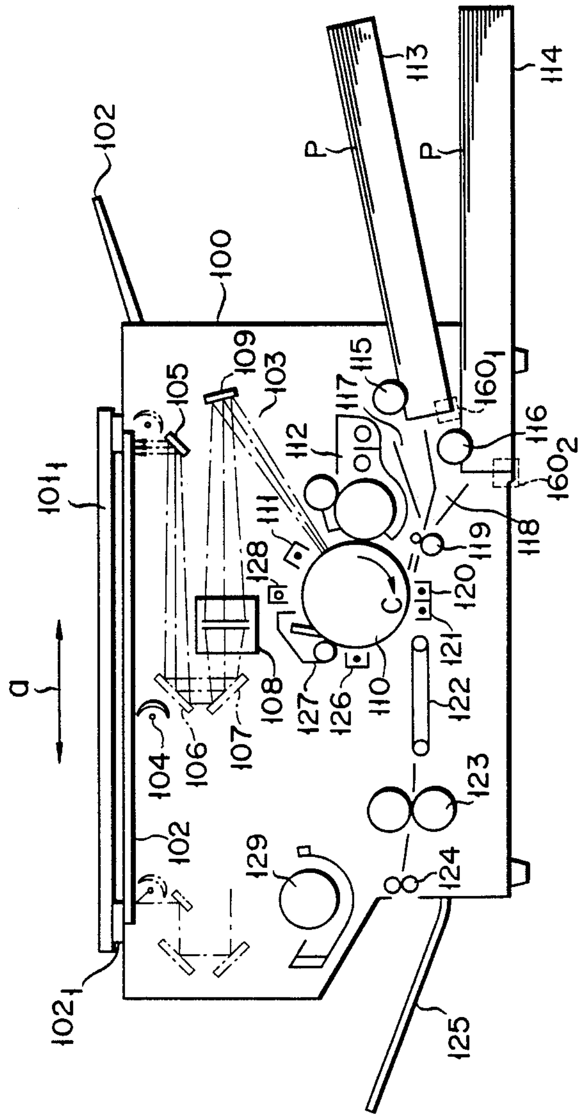
FIG. 5 is a schematic illustration, showing an arrangement of an image forming apparatus according to the embodiment of the present invention.

FIG. 5 schematically shows an electronic copying machine as an image forming apparatus according to the embodiment of the present invention. Reference numeral 100 denotes a copying machine housing. A table for original documents (i.e., transparent glass 102 is affixed on the upper surface of the housing 101. An openable original cover $\mathbf{101_1}$ and a work table $\mathbf{101_2}$ are arranged near the table 102. A fixed scale $\mathbf{112_1}$, as a reference for setting an original, is arranged at one end of the table 102 along the longitudinal direction thereof.

The original set of documents on the original table 102 is scanned for image exposure. The optical system 103, including an exposure lamp 104 and mirrors 105, 106 and 107, reciprocates in the direction indicated by arrow a along the under surface of the original table 102. In this case, the mirrors 106 and 107 move at a speed half that of the mirror 105 so as to maintain a fixed optical path length.

A reflected light beam from the original scanned by the optical system 103, that is, irradiated by the exposure lamp 104, is reflected by the mirrors 105, 106 and 107, transmitted through a lens block 108 for magnification or reduction, and then reflected by a mirror 109 to be projected on a photosensitive drum 110. Thus, an image of the original is formed on the surface of the photosensitive drum 110.

The photosensitive drum 110 rotates in the direction indicated by arrow c so that its surface is wholly charged first by a main charger 111. The image of the original is projected on the charged surface of the photosensitive drum 110 by slit exposure, forming an electrostatic latent image on the surface. The electrostatic latent image is developed into a visible image (toner image) by a developing unit 112 using toner. Paper sheets (image record media) P are delivered one by one from an upper paper cassette 113 or a lower paper cassette 114 by a paper-supply roller 115 or 116, and guided along a paper guide path 117 or 118 to an aligning roller pair 119. Then, each paper sheet P is delivered to a transfer region by the aligning roller pair 119, timed to the formation of the visible image.

The two paper cassettes 113 and 114 are removable attached to the lower right end portion of the housing 101, and can be alternatively selected by operation on a control panel which will be described in detail later. The paper cassettes 113 and 114 are provided respectively with cassette size detecting switches $\mathbf{160_1}$ and $\mathbf{160_2}$which detect the selected cassette size. The detecting switches $\mathbf{160_1}$ and $\mathbf{160_2}$ are each formed of a plurality of microswitches which are turned on or off in response to insertion of cassettes of different sizes.

The paper sheet P delivered to the transfer region comes into intimate contact with the surface of the photosensitive drum 110, in the space between a transfer charger 120 and the drum 110. As a result, the toner image on the photosensitive drum 110 is transferred to the paper sheet P by the agency of the charger 120. After the transfer, the paper sheet P is separated from the photosensitive drum 110 by a separation charger 121 and transported by a conveyor belt 122. Thus, the paper sheet P is delivered to a fixing roller pair 123 as a fixing unit arranged at the terminal end portion of the conveyor belt 122. As the paper sheet P passes through the fixing roller pair 123, the transferred image is fixed on the sheet P. After its fixation, the paper sheet P is discharged into a tray 125 outside the housing 101 by two exit roller pair 124.

After the transfer, moreover, the photosensitive drum 110 is de-electrified by a de-electrification charger 126, when the residual toner on the surface of the drum 110 is removed by a cleaner 127. Thereafter, a residual image on the photosensitive drum 110 is erased by a discharge lamp 128 to restore the initial state. In FIG. 5, numeral 129 designates a cooling fan for preventing the temperature inside the housing 101 from rising.

Figure 1:
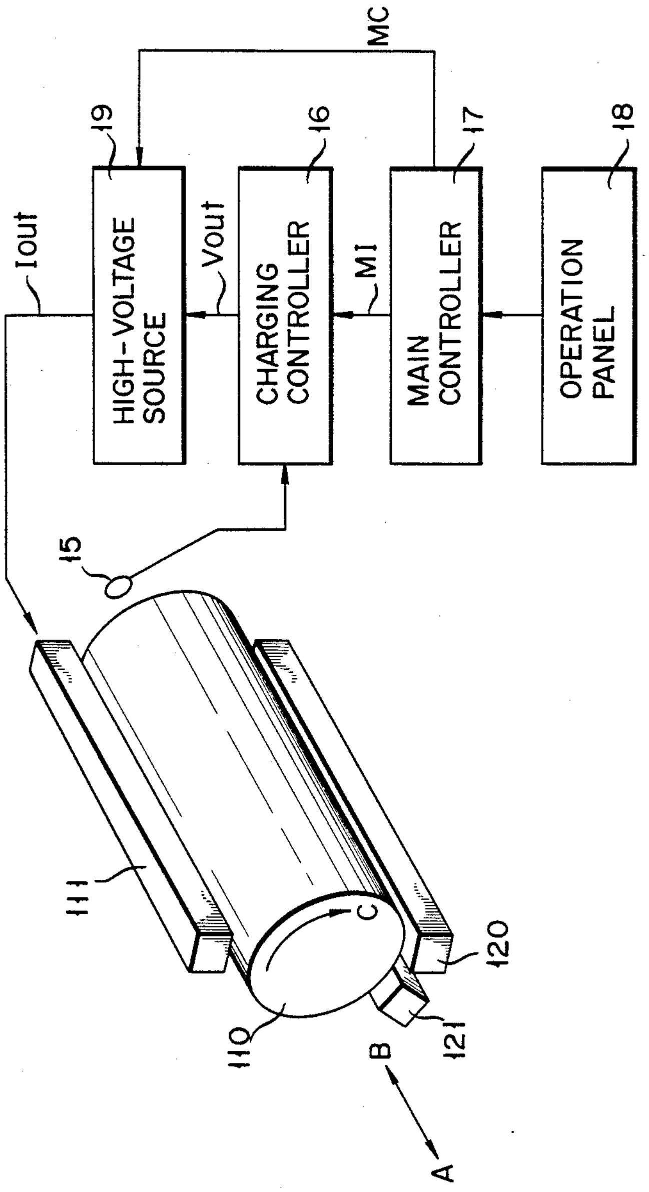
FIG. 1 is a schematic illustration, showing an arrangement of a charging control apparatus for an image carrier according to an embodiment of the present invention.

As pictured in FIG. 1, charger 111 for charging photosensitive drum 110, transfer charger 120 for transferring to paper a toner image formed on photosensitive drum 110, separation charger 121 for separating the paper from photosensitive drum 110, developing unit 112 (see FIG. 5), for developing the electrostatic latent image formed by optical system 103 (see FIG. 5), on photosensitive drum 110 to form the toner image, and a cleaner for cleaning residual toner on photosensitive drum 110, are arranged around photosensitive drum 110 which is made of the same material as a conventional photosensitive drum and serves as an electrostatic latent image carrier. Photosensitive drum 110 is arranged so as to rotate in a direction indicated by arrow C and move in the directions indicated by arrows A and B with respect to the copying machine (see FIG. 5). When photosensitive drum 110 is removed from the copying machine, it is moved in the direction indicated by arrow A, and when photosensitive drum 110 is mounted in the copying machine, it is moved in the direction indicated by arrow B.

A temperature detection means, such as thermistor 15, is arranged near the rear, end face of photosensitive drum 110. An output signal from thermistor 15 is supplied to charging controller 16. Charging controller 16 generates a substantially linear output voltage Vout within a predetermined temperature range, in accordance with detected outputs from thermistor 15 and mode control signal MI, representing a high- or low-sped mode supplied from main controller 17, controlling the overall copying machine. In addition, operation panel 18 is connected to main controller 17. When, for example, a one-to-one copy mode (magnification: 100%), is selected through operation panel 18, the high-speed copy mode is set by main controller 17, and when a variable magnification mode (magnification: less than 100%), is selected the low-speed mode is set. Output voltage Vout, from charging controller 16, is supplied to high-voltage source 19. In this case, high-voltage source 19 is of a contstant voltage type, and is turned on or off in response to control signal MC supplied from main controller 17 so that high-voltage source 19 supplies output current Iout at high voltages (e.g., 600 to 700 volts), to charger 12, thereby controlling the charging of photosensitive drum 110. That is, high-voltage source 19 generates output current Iout, proportional to the output from charging controller 16, so as to compensate for the attenuation of the charge retentivity of photosensitive drum 110. This attenuation is caused by temperature rise.

Figure 2:
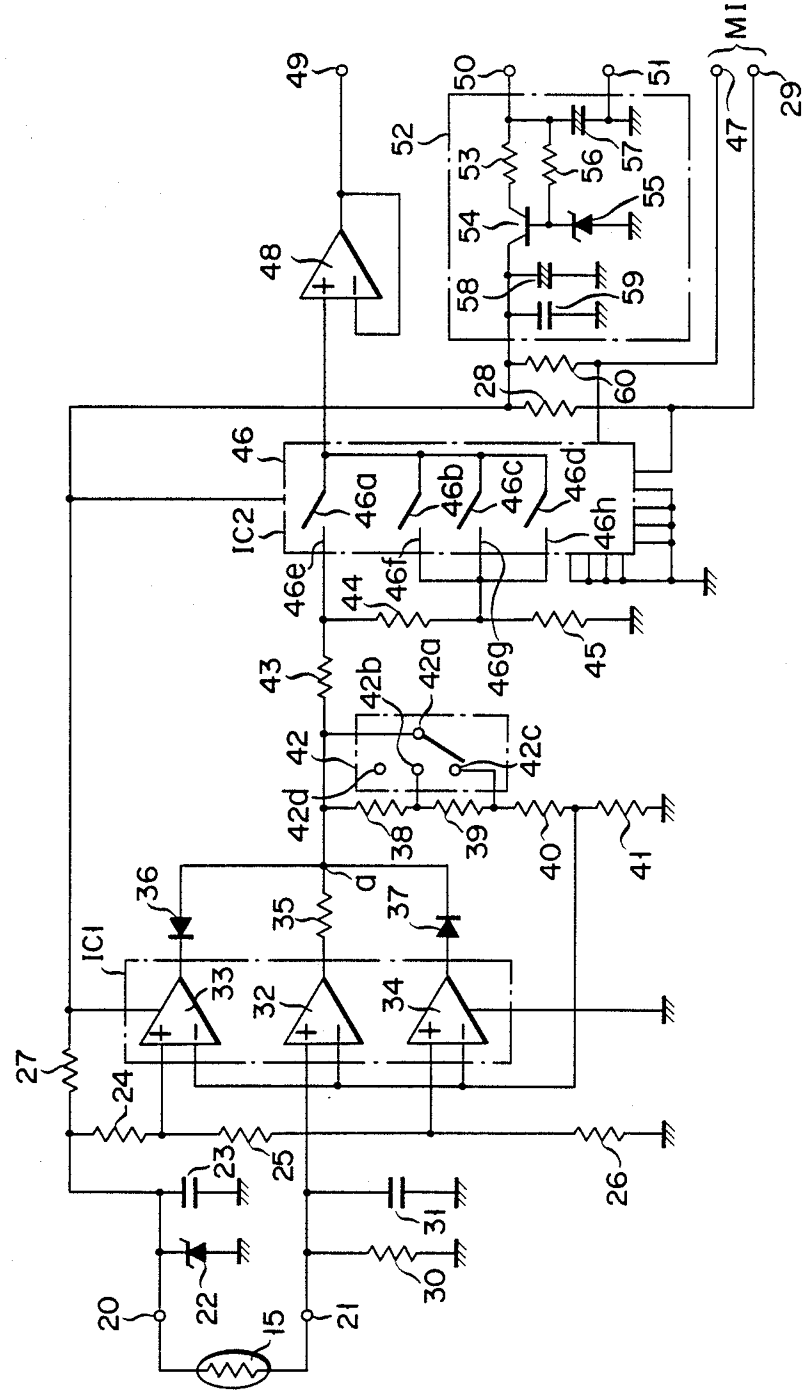
FIG. 2 is a circuit diagram showing a charging quantity controller as in FIG. 1.

FIG. 2 shows charging controller 16. Referring to FIG. 2, thermistor 15 is connected to input terminals 20 and 21. Input terminal 20 is grounded through Zener diode 22 and capacitor 23, and is also grounded through resistors 24, 25, and 26. Furthermore, input terminal 20 is connected to input terminal 29 through resistors 27 and 28.

Input terminal 21 is grounded through resistor 30 and capacitor 31, and connected to the non-inverting input terminal of operational amplifier 32 of integrated circuit IC1. Inverting input terminal, of operational amplifier 32, is connected to each inverting input terminal of operational amplifiers 33 and 34. Non-inverting input terminals, of operational amplifiers 33 and 34, are respectively connected to a node between resistors 24 and 25, and a node between resistors 25 and 26. Operational amplifier 33 serves to set the upper limit temperature (e.g., 42° C.), of photosensitive drum 110, and operational amplifier 34 serves to set the lower limit temperature (e.g., 30° C.), of photosensitive drum 11. One terminal of resistor 35 is connected to the output terminal of operational amplifier 32. The other terminal *a*, of resistor 35, is connected to the output terminal of operational amplifier 33 through forward-biased diode 36, and connected to the output terminal of operational amplifier 37 through reverse-biased diode 37. Furthermore, the other terminal *a*, of resistor 35, is grounded through resistors 38, 39, 40, and 41, while being connected to movable contact **42*a*, of first switch 42, constituted by, e.g., a slide switch. First switch 42 serves to adjust gains of operational amplifiers 32, 33, and 34. Stationary contacts 42*b* and 42*c*, of first switch 42, are respectively connected to a node between resistors 38 and 39, and to a node between resistors 39 and 40, while stationary contact 40*d* is open. In addition, a node between resistors 40 and 41 is connected to the inverting input terminals of operational amplifiers 32, 33, and 34**.

The other terminal *a*, of resistor 35, is grounded through resistors 43, 44, and 45 so that two different levels of voltages are generated by resistors 44 and 45. The generated voltages are selectively extracted by second switch 46, constituted by integrated circuit IC2. More specifically, movable contacts **46*a* to 46*d* of second switch 46, are commonly connected to each other. Stationary contact 46*e*, connected to movable contact 46*a*, is connected to a node between resistors 43 and 44, and stationary contacts 46*f* and 46*h*, respectively connected to movable contacts 46*b* to 46*d*, are connected to a node between resistors 44 and 45**.

Second switch 46 is controlled by mode control signal MI, which is supplied to input terminals 29 and 47. For example, when mode control signal MI is in the high-speed mode, only movable contact **46*a* is turned on, and when mode control signal MI is in the low-speed mode, only movable contacts 46*b*, 46*c*, and 46*d* are turned on. The voltage thus extracted, as output voltage Vout, is supplied to output terminal 49 through amplifier 48, and then applied to high-voltage source 19 which is connected to output terminal 49**.

A voltage of +33 volts is applied to power source terminal 50, while power source terminal 50 is grounded. Power source circuit 52 is connected to power source terminals 50 and 51. The collector, of transistor 54, is connected to power source terminal 50 through resistor 53. The base of transistor 54 is grounded through Zener diode 55, while being connected to power source terminal 51 through resistor 56 and capacitor 57. Furthermore, the emitter of transistor 54 is grounded through capacitors 58 and 59, while being connected to input terminal 47 through resistor 60. A source voltage of 11 volts, generated by power source circuit 52, is applied to integrated circuit IC1, constituted by operational amplifiers 32 to 34, and to integrated circuit IC2, constituting second switch 46. In addition, a reference voltage of (e.g., 5.6 volts), is generated by Zener diode 22.

An operation of the apparatus having the above arrangement will be described below.

When the ambient temperature of photosensitive drum 11 falls within the range of, e.g., the lower limit temperature of 30° C. and the upper limit temperature of 42° C., diodes 36 and 37 are rendered non-conductive. As a result, the voltage, at the non-inverting input terminal of operational amplifier 32, is changed in accordance with changes in resistance of thermistor 15, which accordingly is caused by changes in temperature. Correspondingly, the output voltage from operational amplifier 32 is substantially changed linearly. The output voltage is extracted through second switch 46 and operational amplifier 48, and supplied to high-voltage source 19. As a result, changes in sensitivity (charging) of photosensitive drum 110 caused by changes in ambient temperature can be compensated by controlling output current Iout supplied at a high voltage from high-voltage source 19 to charger 111 in accordance with changes in the temperature.

When the ambient temperature of photosensitive drum 110 is lowered to 30° C. or below, the resistance of thermistor 15 is increased, so that a voltage applied to the non-inverting input terminal of operational amplifier 32 becomes lower than that applied to the non-inverting input terminal of operational amplfier 34. An output voltage from operational amplifier 32 is lower than that from operational amplifier 34. As a result, diode 37 is rendered conductive, so that a voltage at the other terminal a of resistor 35 is kept at the same level as that of the voltage at the non-inverting input terminal of operational amplifier 34, thereby preventing drop in the voltage.

In contrast to the above case, if the ambient temperature of photosensitive drum 110 is increased and exceeds the upper limit temperature of 42° C., the resistance of thermistor 15 is decreased, and the voltage at the non-inverting input terminal of operational amplifier 32 is increased. Consequently, when the voltage at the other terminal a of resistor 35 becomes higher than that at the non-inverting input terminal of operational amplifier 33, diode 36 is rendered conductive. As a result, the voltage at the other terminal a of resistor 35 is kept at the same level as that of the voltage at the non-inverting input terminal of operational amplifier 33, and controlled not to be increased.

Figure 3:
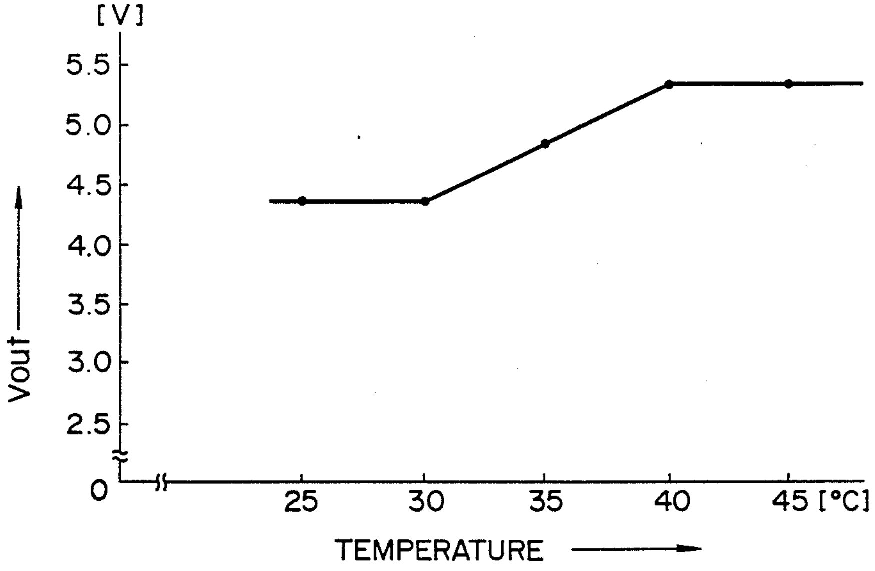
FIGS. 3 and 4 are graphs, explaining the operating characteristics of the present invention, respectiveley.
Figure 4:
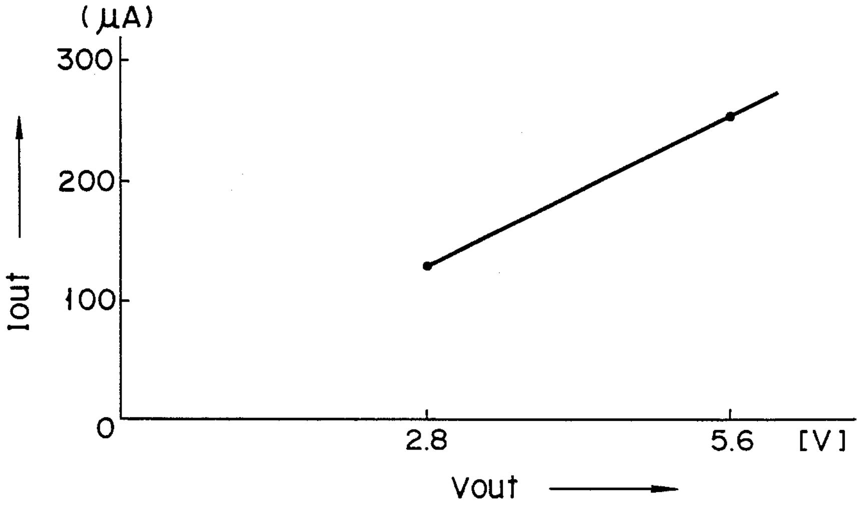

FIG. 3 shows a relationship between output voltage Vout and temperatures when movable contact 42*a* of first switch 42 is connected to stationary contact 42*d*, and movable contact 46*a* of second switch 46 is closed. FIG. 4 shows a relationship between output voltage Vout and output current Iout from high-voltage source 19.

According to the above embodiment, predetermined output voltage Vout is generated from charging controller 16 in accordance with a temperature around photosensitive drum 110 detected by thermistor 15 so that output current Iout supplied at a high voltage to charger 111 is controlled in accordance with output voltage Vout. Therefore, changes in sensitivity (charging) of photosensitive drum 110, which are caused by changes in the temperature, can be prevented and can be compensated to be always held at an optimal level, thereby preventing degradation in quality of a copied image.

Although in the above embodiment, thermistor 15 serving as the temperature detection means is arranged near photosensitive drum 110 to detect the ambient temperature of photosensitive drum 110, for example, thermistor 15 may be mounted on a rotary shaft of photosensitive drum 110 to detect the temperature of photosensitive drum 110 through the rotary shaft. Furthermore, high-voltage source 19 may be of a constant current type.

Various changes and modifications can be made without departing from the scope of the invention.

As has been described above, according to the present invention, there is provided a charging quantity control apparatus for image carrier, wherein a temperature of the image carrier is detected by a temperature detection means, a charging control means generates an output, whose level is changed substantially linearly within a predetermined temperature range in accordance with the detected temperature, and a power source means generates an output required for charging the image carrier in accordance with the output from the charging control means, thereby preventing changes in charging (sensitivity) of the image carrier which is caused by changes in the temperature, and compensating the charging to be always held at the optimal level.

What is claimed is:

1. A charging control apparatus for an image carrier, comprising:

an image carrier for carrying an electrostatic latent image;

a charger for charging said image carrier to carry the electrostatic latent image;

a high-voltage source for supplying a high-voltage output to said charger;

a temperature detection means for detecting the temperature of said image carrier; and charging control means for outputting a control signal which regulates the high-voltage output from said high-voltage source in response to a temperature detection signal of said temperature detection means, the control signal having the ability to compensate for changes in the charging from said image carrier by controlling the high-voltage output of said high-voltage source, in accordance with changes in temperature of said image carrier;

the control signal having a characteristic curve ascending substantially linearly within a predetermined temperature range, the signal being held at predetermined levels at lower and higher temperatures falling outside the predetermined temperature range.

2. An apparatus according to claim 1, wherein a lower limit value of the predetermined temperature range is about 30° C.

3. An apparatus according to claim 1, wherein an upper limit value of the predetermined temperature range is about 42° C.

4. An apparatus according to claim 1, wherein said temperature detection means comprises a thermistor, arranged near said image of carrier.

5. An apparatus according to claim 1, wherein said charging control means comprises a first operational amplifier, providing an output voltage corresponding to a temperature detection signal from said temperature detection means within the predetermined temperature range, second and third operational amplifiers for providing output voltages to be held at first and second predetermined levels respectively at lower and higher temperatures falling outside the predetermined temperature range, and means for determining operating points of said second and third operational amplifiers.

6. An apparatus according to claim 5, wherein said charging control means includes means for adjusting gains of said first to third operational amplifiers.

7. An apparatus according to claim 1, wherein said charging control means controls a current value at a high-voltage output from said high-voltage source, using the control signal.

8. An apparatus according to claim 1, wherein said apparatus further comprises main control means for controlling the control signal supplied from said charging control means in accordance with a high-speed mode for an image formation of an equal magnification and a low-speed mode for an image formation of a variable magnification.

9. An apparatus according to claim 8, wherein said main control means further controls an ON/OFF operation of said high-voltage source.

10. A charging control apparatus for an image carrier, comprising:

an image carrier for carrying an electrostatic latent image;

a charger for charging said image carrier to carry the electrostatic latent image;

source means for supplying a charging voltage to said charger;

temperature detection means for detecting the temperature of said image carrier; and charging control means for outputting a control signal which regulates the charging voltage supplied from said source means in response to a temperature detection signal detected by said temperature detection means, the control signal having a characteristic curve ascending substantially linearly within a predetermined temperature range.

* * * * *